United States Patent [19]

Stephens

[11] 4,319,239
[45] Mar. 9, 1982

[54] CCD CAPACITANCE MODULATION MATRIX FOR LIQUID CRYSTAL DISPLAYS

[75] Inventor: Craig P. Stephens, San Jose, Calif.

[73] Assignee: Hughes Aircraft Company, Culver City, Calif.

[21] Appl. No.: 153,304

[22] Filed: May 27, 1980

[51] Int. Cl.³ .............................................. G09G 3/18
[52] U.S. Cl. .................................... 340/784; 350/336; 358/241
[58] Field of Search ........................ 340/784; 350/336; 358/241

[56] References Cited

U.S. PATENT DOCUMENTS 4,103,297  7/1978  McGreivy et al. ............. 340/784 X
4,239,346 12/1980  Lloyd ............................. 340/784 X Primary Examiner—David L. Trafton
Attorney, Agent, or Firm—Robert M. Wallace; William H. MacAllister

[57] ABSTRACT

The optical response of a liquid crystal layer is controlled by an applied a.c. electric field having its amplitude in selected regions of the liquid crystal modulated by charge stored in an underlying charge transfer device.

15 Claims, 7 Drawing Figures

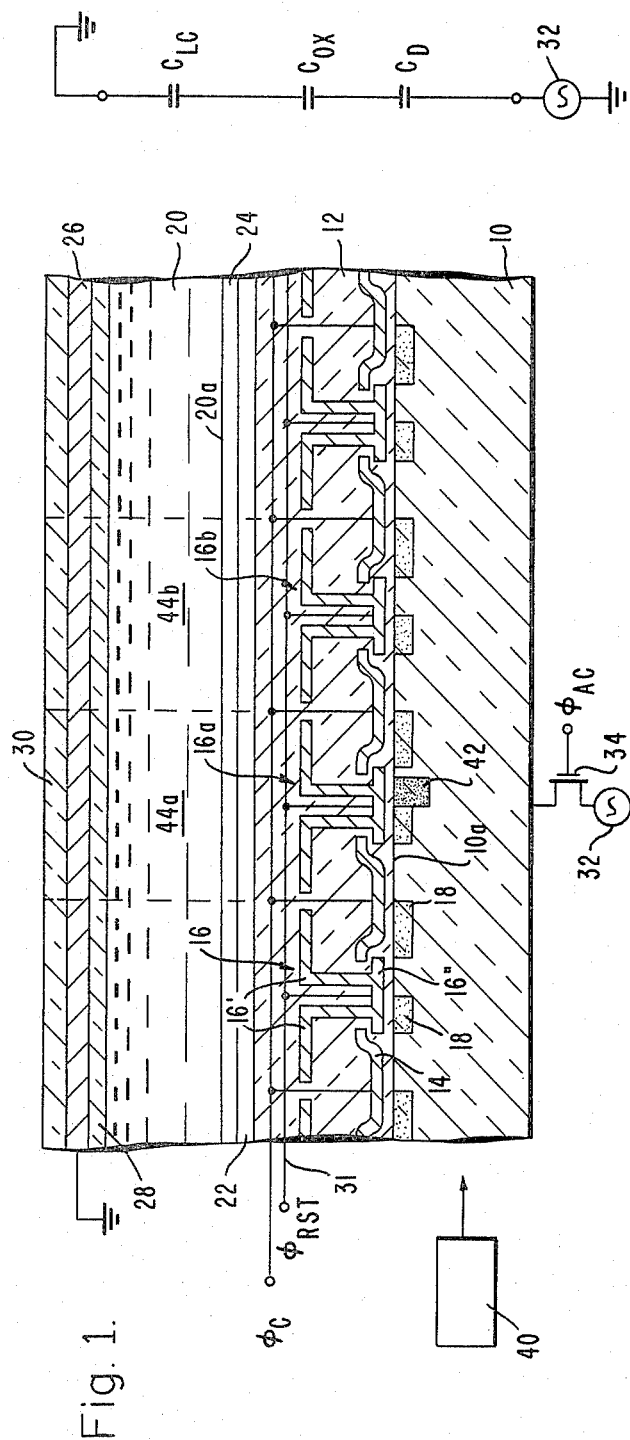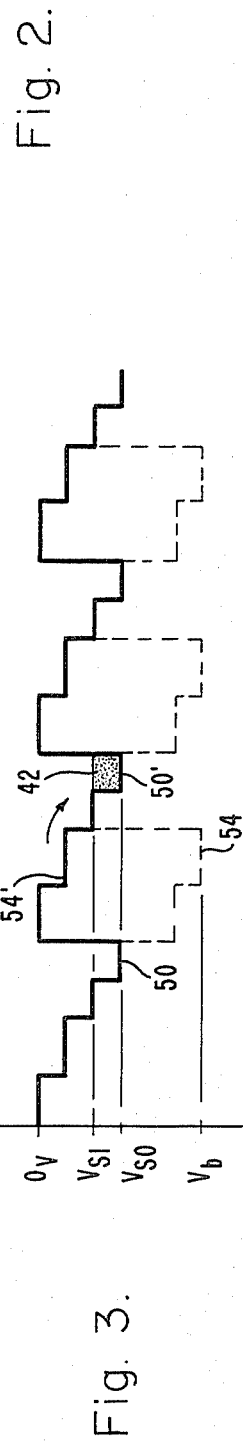

CCD CAPACITANCE MODULATION MATRIX FOR LIQUID CRYSTAL DISPLAYS

TECHNICAL FIELD

This invention is useful for controlling the image displayed by a planar liquid crystal layer using a charge coupled device input without applying a d.c. (direct current) voltage across the liquid crystal layer.

BACKGROUND ART

Although charge coupled devices have been used to control the image displayed by a liquid crystal layer, in the prior art the implementation of charge coupled device control of liquid crystal layers has required the use of a nearly intrinsic semiconductor layer and the application of a d.c. voltage across the liquid crystal layer. Such a device is exemplified in U.S. patent application Ser. No. 005,148, filed Jan. 22, 1979 by Grinberg, Waldner and Jenney, entitled "CCD Readout Structure for Display Applications" and assigned to the assignee of the present application. In the Grinberg application, a charge coupled device (CCD) for controlling the image display of a liquid crystal layer includes a nearly intrinsic silicon substrate having a charge coupled device serial register formed in a planar epitaxial silicon layer on the bottom surface of the substrate and a planar liquid crystal layer formed on the top surface of the substrate. Each charge packet stored in the charge coupled device drifts through the intrinsic layer toward a small overlying portion of the liquid crystal layer under the influence of a vertical d.c. electric field so that the electric field, and therefore the optical properties, of the small liquid crystal portion are changed. Thus, using a large plurality of charge packets stored at selected locations in the bottom epitaxial layer, the optical properties of a corresponding plurality of overlying portions of the top liquid crystal layer may be modulated. The liquid crystal layer may be considered to be divided into a plurality of small portions, each small portion corresponding to one of a large plurality of matrix elements of a complete image formed in the liquid crystal layer.

One disadvantage of such a device is that the charge packets may diffuse as they drift through the substrate toward the liquid crystal layer, thus distorting or diffusing the image ultimately displayed by the liquid crystal layer. Therefore, charge packet diffusion in the substrate must be minimized by forming the substrate to be as nearly intrinsic as possible and by forming the substrate to be of a minimum thickness. A related difficulty is that the thin intrinsic substrate must be extremely flat and of a uniform thickness. Otherwise, the response of the liquid crystal to each charge packet may be different depending upon its location, which would introduce spatial nonuniformities into the image displayed by the liquid crystal layer. Another difficulty is that the d.c. electric field supporting the charge packet drift through the intrinsic silicon layer requires a d.c. voltage to be applied to the liquid crystal layer. It is well known that liquid crystals deteriorate faster whenever a d.c. voltage is applied across the liquid crystal.

In summary, the vertical charge packet drift through the intrinsic substrate of the prior art may be characterized as a current source creating a current of charge packets altering the electric field in selected matrix elements of the liquid crystal layer in order to control the displayed image, requiring the use of an intrinsic substrate and the application of a d.c. voltage across the device.

SUMMARY OF THE INVENTION

The present invention eliminates the necessity for charge packets to drift between a semiconductive layer and a liquid crystal layer or otherwise form a current source of charge packets impacting the liquid crystal layer, so that there is no necessity that the semiconductive substrate be intrinsic or nearly intrinsic nor that it be particularly flat or of uniform thickness. Instead, the optical response of the liquid crystal layer is controlled by an applied sinusoidal electric field having its amplitude in selected regions of the liquid crystal modulated by charge stored in a charge coupled device. In accordance with the present invention, a charge coupled device is formed on the top surface of a planar semiconductive substrate and a planar liquid crystal layer is placed immediately over the charge coupled device. The mere presence of charge packets stored at selected locations in the charge coupled device modulates the substrate depletion capacitance beneath those matrix elements of the liquid crystal layer which overlie the charge packets. A purely sinusoidal vertical electric field is capacitively coupled across the entire device so that its amplitude is decreased at the matrix elements of the liquid crystal layer which overlie the selected charge packet locations in proportion to their decreased depletion capacitance. The decrease in amplitude of the sinusoidal electric field at the selected matrix elements of the liquid crystal layer changes the optical properties in those selected matrix elements to create a visible contrast with the other matrix elements, thereby producing an image. An additional advantage of the invention is that there is no d.c. component of voltage applied across a liquid crystal layer so that the deterioration of the liquid crystal layer is not accelerated as in prior art devices.

BRIEF DESCRIPTION OF THE DRAWINGS

The invention is best understood by reference to the accompanying drawings, of which:

FIG. 1 is a simplified cross-sectional view of the presently preferred embodiment of the invention;

FIG. 2 is an equivalent model circuit corresponding to the device of FIG. 1;

FIG. 3 is a simplified diagram of the substrate electrical surface potential corresponding to the sectional view of FIG. 1;

DETAILED DESCRIPTION OF THE INVENTION

Figure 4:
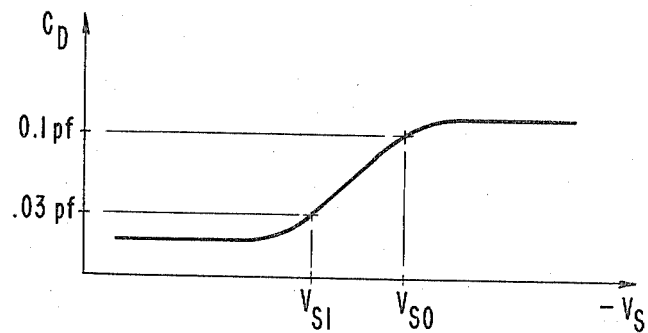
FIG. 4 is an exemplary plot of the depletion capacitance of the substrate of FIG. 1 as a function of its surface potential.

In accordance with the present invention illustrated in FIG. 1, the necessity for an intrinsic substrate and the necessity for a d.c. electric field is eliminated because the charge packets stored by the charge coupled device (CCD) of the present invention do not leave the CCD channel but instead remain stationary while modulating the depletion capacitance beneath selected overlying regions of the liquid crystal display. The charge coupled device and the liquid crystal layer overlie one surface of a semiconductive substrate. The charge coupled device includes an epitaxial silicon layer 10 of n-type conductivity and an overlying dielectric layer 12 in which a plurality of clocked poly-crystalline silicon electrodes 14 and a plurality of resettable floating poly-crystalline silicon electrodes 16 are formed. It should be noted that, whereas the doped silicon layer 10 has a sheet resistivity of approximately 50 ohm-centimeters, the intrinsic silicon of the type employed in the above referenced Grinberg application preferably has a sheet resistivity of the order of 2000 ohm-centimeters. The charge coupled device of FIG. 1 also includes a plurality of regions 18 of p-type conductivity which force charge transfer beneath the electrodes 14, 16 to be in one direction only (namely from left to right in FIG. 1) in a manner to be described.

A liquid crystal layer 20 is placed over the oxide layer 12 and is separated therefrom by a light blocking layer 22 and a light reflecting layer 24 of the type discussed in the above-referenced Grinberg application. A conductive ground plane 26 overlies the top face of the liquid crystal layer 20 and is separated from it by an intervening insulating layer 28. A glass cover film 30 overlies the top face of the ground electrode 26.

The charge coupled device of FIG. 1 is controlled by a clock signal $\phi_c$ (illustrated in FIG. 5a) applied to the clocked electrodes 14 and by a reset clock signal $\phi_{rst}$ (illustrated in FIG. 5b) applied to the resettable floating electrodes 16 through a conductor 31 connected to each electrode 16. An alternating current (a.c.) voltage source 32 applies a sinusoidal voltage of a frequency on the order of 100 Hz between the silicon layer 10 and the ground plane 26 through a switch 34 controlled by a clock signal $\phi_{ac}$ (illustrated in FIG. 5c).

The clocked electrodes 14 overlie alternate portions of top surface 10a of the substrate 10. The remaining portions of the top surface 10a underlie the resettable floating electrodes 16. A first electrode section 16' of each resettable floating electrode faces a portion of the liquid crystal bottom surface 20a and shields it from the clocked electrodes 14 so as to exclusively control the electrical field applied to it. A second electrode section 16" connected to the first section 16' cooperates with the clocked electrodes 14 to effect charge transfer in the substrate surface 10a in a manner to be described.

The charge coupled device of FIG. 1 modulates the optical properties in selected portions or regions of the liquid crystal 20 by storing charge packets supplied by a video signal charge injection source 40 beneath selected ones of the floating electrodes 16 in the substrate surface 10a. The depletion capacitance between the silicon layer 10 and each of the selected floating electrodes is reduced by the presence of the charge packets. As a result, the capacitive coupling between the a.c. voltage source 32 and the regions of the liquid crystal layer 20 overlying the selected floating electrodes 16 is changed. The entire liquid crystal layer 20 may be considered to be divided into various regions or matrix elements 44, each region overlying a particular one of the floating electrodes 16 and therefore having its electric field controlled by that particular floating electrode. For example, a charge packet 42 underlying the floating electrode 16a reduces the depletion capacitance through which the a.c. voltage from the source 32 couples from the silicon layer 10 to the floating electrode 16a, thereby reducing the voltage drop $V_{LC}$ between the top and bottom of the region 44a of the liquid crystal 20 controlled by the floating electrode 16a.

Referring to FIG. 2, an equivalent circuit of the device of FIG. 1 is shown in which the coupling between the silicon layer 10 and one of the floating electrodes 16 is modeled as a depletion capacitor $C_d$, the capacitive coupling between the one floating electrode 16 and the liquid crystal layer 20 is modeled as a capacitor $C_{ox}$ while the capacitive coupling through the liquid crystal layer 20 is modeled as a capacitor $C_{LC}$. Because the capacitors in FIG. 2 are all connected in series, variation of the depletion capacitance $C_d$ causes a proportional variation in the voltage drop $V_{LC}$ across the liquid crystal capacitor $C_{LC}$ whenever the a.c. voltage, $V_{ac}$, of the source 32 is applied to the capacitive network of FIG. 2. Typically, the liquid crystal layer may have a capacitance $C_{LC}$ of 0.1 picofarad. In the preferred embodiment of the invention, the dielectric layer 12 is formed of silicon dioxide of approximately 300 angstroms thickness so that it has a typical oxide capacitance $C_{ox}$ equal to about 0.2 picofarads. As previously mentioned, the silicon layer 10 is preferably an epitaxial silicon layer formed over a crystalline silicon substrate (not shown) so that the depletion capacitance $C_d$ between the silicon layer 10 and the floating electrode 16 is either 0.1 picofarads or 0.03 picofarads, depending upon whether a charge packet is absent or present, respectively.

Using elementary analytical techniques, the voltage dividing ratio, $V_{LC}/V_{ac}$ may be computed from the capacitances $C_{LC}$, $C_{ox}$, and $C_d$ using the equivalent circuit of FIG. 2 as a model. The following is a table of results obtained for the foregoing typical capacitance values for two cases, namely the case in which no charge ("0") is stored beneath a floating electrode (for example, the floating electrode 16b FIG. 1) and the case in which a charge packet ("1") is stored beneath a floating electrode (for example, the charge packet 42 beneath the floating electrode 16a).

|  | Charge | |
| --- | --- | --- |
|  | 0 | 1 |
| $C_{LC}$ | 0.1 pf | 0.1 pf |
| $C_{ox}$ | 0.2 pf | 0.2 pf |
| $C_d$ | 0.1 pf | 0.03 pf |
| $V_{LC}$ | 0.4 | 0.2 |
| $V_{ac}$ |  |  |

Referring to the foregoing table, the voltage dividing ratio $V_{LC}/V_{ac}$ varies between 0.2 and 0.4 depending upon whether or not a charge packet is stored beneath the floating electrode. The table shows that the voltage drop across the region 44b, controlled by the electrode 16b will be twice the voltage drop across the region 44a, controlled by the electrode 16a, because the electrode 16b overlies no charge packet ("0") while the electrode 16a overlies the charge packet 42 ("1") in the example illustrated in FIG. 1. Thus, a "switching ratio" of 2 may be achieved in the present invention. If, for example, the source 32 has a sinusoidal peak-to-peak voltage of 100 volts, the voltage drop across the liquid crystal region 44a is 20 volts while the voltage drop across the region 44b is 40 volts. The difference between the 20 volts a.c. and the 40 volts a.c. across the regions 44a and 44b, respectively, is sufficient to produce a visible contrast between the optical properties of the regions 44a and 44b.

It should be noted that the capacitive values given in the above table are to be taken as typical values only, because various materials different from those suggested may be selected to form the semiconductive 10, the oxide layer 12 and the electrodes 14 and 16. In the example of the foregoing table, the layer 10 is n-doped epitaxial silicon having a sheet resistance of 50 ohm-centimeters, the oxide layer 12 is silicon dioxide of about 300 angstroms thickness and the electrodes 14 and 16 are polycrystalline silicon. Variations from the capacitive values given in the foregoing table may also occur due to variations in semi-conductor processing parameters.

The electrical surface potential $V_s$ of the silicon surface 10a is illustrated in FIG. 3 corresponding to the cross-sectional view of FIG. 2. The floating electrodes 16 are periodically reset by the clock signal $\phi_{rst}$ to a constant potential. The gate diffusions 18 are preferably of p-type conductivity so that the surface potential $V_{s1}$ in each portion of the surface 10a having a diffusion 18 and underlying one of the floating gates ing portion of the surface 10a beneath the one floating gate 16. Therefore, the overall surface potential $V_s$ has the step configuration illustrated in FIG. 3. Likewise, the surface potential beneath the clocked electrodes 14 also has a step configuration because of the presence of other p-type regions 18 underlying portions of the clocked electrodes 14. The clocked electrodes 14 cause the underlying surface potential $V_s$ to be at a maximum value, 0V, higher than the negative potential $V_{s1}$ whenever the clock signal $\phi_c$ is off and to be at a minimum value $V_b$ less than the potential negative $V_{s0}$ whenever the clock signal $\phi_c$ is on.

Charge is transferred from left to right in the substrate surface 10a by the periodic clocking of the electrodes 14 under the control of the clock signal $\phi_c$ in a manner well known in the art. Each potential well 50 beneath one of the floating electrodes 16 is formed whenever the clock signal $\phi_c$ is "off", while adjacent potential wells 54 are formed whenever the clock signal $\phi_c$ is "on". Charge stored in a first one of the potential wells 50 falls into an adjacent potential well 54 whenever the clock signal $\phi_c$ is turned on. Subsequently, when the clock signal $\phi_c$ is turned off, the charge packet in the potential well 54 is raised to the higher potential well 54' so that it falls into a second potential well 50'. It should be noted that whenever an empty potential well 50 becomes filled with charge, its potential is increased approximately from $V_{s0}$ to $V_{s1}$.

A deeper understanding of the invention may be had by reference to FIG. 4. The depletion capacitance between a particular one of the resettable floating gates 16 and the substrate 10 is plotted in FIG. 4 as a function of the surface potential $V_s$ of FIG. 3. Capacitance-voltage plots of the type illustrated in FIG. 4 are dicussed in Grove, *Physics of Semi-Conductors*, 1967. Comparing FIGS. 3 and 4, it is seen that the depletion capacitance near the surface portion at potential $V_{s1}$ (beneath the gate 16a), in which a charge packet 42 is stored, is approximately 0.03 picofarad while the depletion capacitance near the surface portion at potential $V_{s0}$ (beneath the gate 16b), in which no charge packet is stored, is approximately 0.1 picofarad. Thus, it is apparent that the modulation of the depletion capacitance is generally effected by the change in surface potential, which is controlled by the depth of the potential well 50 (or, $V_{s1}-V_{s0}$), by the area of each electrode 16 and by the size of the charge packet 42. Thus, a skilled worker may vary the foregoing parameters (for example, by changing the amplitude of the clock signals $\phi_c$ or $\phi_{RST}$ to change $V_{s0}$ or $V_{s1}$) so that the depletion capacitance $C_d$ alternates between values other than the 0.03 picofarads and 0.1 picofarads discussed herein.

Charge packets may be stored under selected ones of the floating gates 16 in a plurality of parallel charge coupled devices of the type above-described located beneath a single liquid crystal layer, the plurality of charge storage sites in each of the CCD's corresponding to an equal plurality of matrix elements in the liquid crystal display. Therefore, the image displayed by the liquid crystal layer is a function of the depletion capacitance modulated by each of the stored charge packets in the manner described above.

Figure 5A:
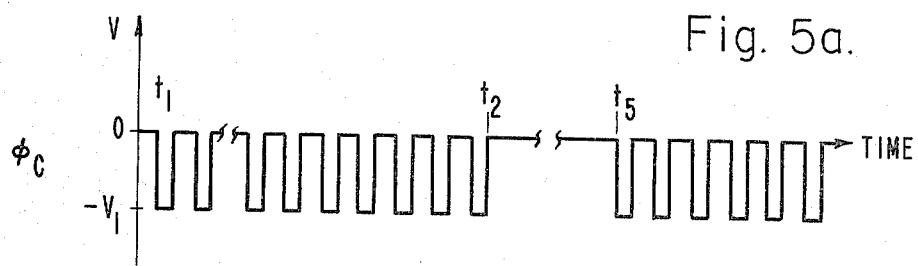
FIGS. 5a–5c includes diagrams of the time domain waveforms of various clock signals applied to the device of FIG. 1.
Figure 5B:
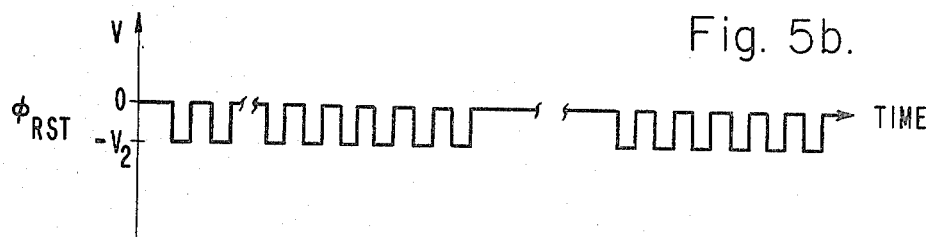
Figure 5C:
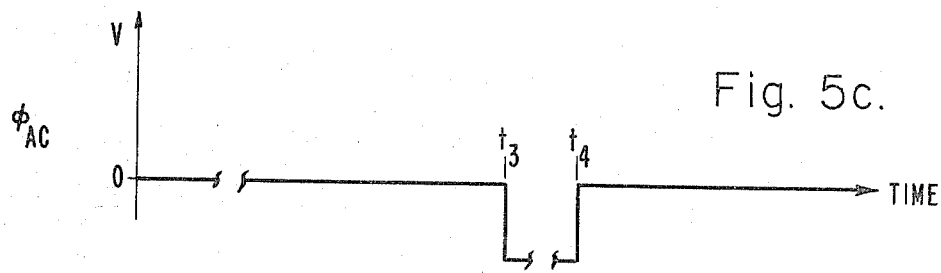

Referring to FIGS. 5a–5c the clock signal $\phi_c$ is a negative pulse train having a negative peak voltage $-V_1$ while the clock signal $\phi_{rst}$ is the complement of the clock signal $\phi_c$ having a negative peak voltage $-V_2$. The clock signals $\phi_c$ and $\phi_{rst}$ are both turned on simultaneously at time $t_1$ to transfer charge packets through the charge coupled device of FIG. 1 in the manner described above in connection with FIG. 3, until an entire frame of charge packets has been loaded into the charge coupled device so that a complete video frame or image is stored under the liquid crystal at time $t_2$. At time $t_2$ the clock signals $\phi_c$ and $\phi_{rst}$ are turned off so that the charge packets become stationary at time $t_2$ and, shortly thereafter, at time $t_3$, the clock signal $\phi_{ac}$ is turned on so that the voltage $V_{ac}$ of the sinusoidal voltage source 32 is applied to the device of FIG. 1 to activate the liquid crystal 20. After a selected amount of time has elapsed, the clock signal $\phi_{ac}$ is turned off at time $t_4$. At time $t_5$ the clock signals $\phi_c$ and $\phi_{rst}$ are again turned on to transfer the first frame of charge packets out of the CCD and to transfer into the CCD a new frame of charge packets representing a new video frame or image, the entire process then being repeated.

The transfer of minority carriers or charge packets 42 in serial succession beneath the control electrodes 16 serves to alter the surface charge in the semiconductive substrate 10 and thereby modulate the capacitance between the substrate 10 and selected ones of the electrodes 16 under which the minority carriers of packets 42 are stored or held. Thus, the surface charge may be altered by means of a charge coupled device comprising the clocked electrodes 14, 16 and the charge injection source 40, as already described. In an alternative embodiment, the surface charge may be changed without the use of a charge coupled device by first disconnecting the electrical conductor 31 from each of the control electrodes 16 (so that the electrodes 16 are each isolated from one another) and then applying a constant (D.C.) negative voltage to only selected ones of the control electrodes 16 (such as the control electrode 16a). In this alternative embodiment, the negative D.C. voltage on the electrode 16a inverts the underlying substrate surface so that minority carriers (holes) are held beneath the electrode 16a to form a charge packet 42. The charge packet 42 changes the capacitance through which the A.C. voltage source 32 is coupled between the substrate 10 and the electrode 16a to the liquid crystal layer 20, as previously described in connection with the preferred embodiment. The application of the D.C. voltage to the control electrode 16a, in the absence of the A.C. voltage source 32, has no substantial effect on the optical properties of the liquid crystal layer 20 because the insulator layer 28 prevents any D.C. current from flowing through the liquid crystal layer 20. It is only after the A.C. voltage source 32 is applied that the optical properties of the liquid crystal layer 20 are changed in accordance with the presence or absence of charge 42 beneath selected ones of the electrodes 16.

It is the inventor's opinion that the charge coupled device addressing of the preferred embodiment is superior to the alternative embodiment. However, the inventor's assignee prefers the alternative embodiment because it is useful in a liquid crystal transistor matrix of the type currently being made by the inventor's assignee.

It should be recognized that transfer of charge between the charge coupled device and the overlying liquid crystal layer is eliminated in the invention and that the image displayed by the liquid crystal layer is controlled by storing minority charge carriers in a stationary manner to modulate the substrate depletion capacitance beneath an electrode controlling the applied A.C. electric field intensity in a selected matrix element of the liquid crystal layer. Therefore, the underlying silicon substrate does not have to be intrinsic and the response of the device is not overly-sensitive to variations in the thickness of the underlying substrate. Furthermore, no net D.C. current flows through the liquid crystal layer, thus minimizing the deterioration or aging process in a liquid crystal layer.

The liquid crystal CCD matrix of this invention is useful for image displays including digital displays useful with watches or calculators, and liquid crystal light valves used in video graphics projectors.

What is claimed is:

1. An image producing system including a capacitance modulation matrix, said matrix comprising:
    a semiconductive base;
    a liquid crystal layer overlying said base;
    a plurality of insulated clocked transfer electrodes disposed between said base and said liquid crystal layer;
    a plurality of resettable floating electrodes also disposed between said base and said liquid crystal layer, each of said floating electrodes comprising:
        (a) a second electrode section overlying said base between adjacent ones of said transfer electrodes, and
        (b) a first electrode section facing said liquid crystal so as to control the electrical potential of an optical matrix portion thereof;
    clock signal means connected to said floating electrodes and to said transfer electrodes for transferring and storing charge packets in said semiconductive base beneath selected ones of said floating electrodes; and
    means for coupling a sinusoidal voltage across said liquid crystal and said base.

2. A capacitance modulation matrix, comprising:
    a liquid crystal layer;
    a semiconductive layer underlying said liquid crystal layer;
    a plurality of resettable floating electrodes between said liquid crystal layer and said semiconductive layer, each of said floating electrodes comprising:
        (a) a first electrode section facing a region of said liquid crystal layer so as to define an image matrix element therein, and
        (b) a second electrode section facing a region of said semiconductor;
    means for applying a sinusoidal voltage across said liquid crystal layer and said semiconductive layer;
    a video signal source; and
    means responsive to said video source for modulating the capacitance between selected ones of said floating electrodes and corresponding ones of said image matrix elements by altering the charge in said layer beneath said selected floating electrodes.

3. The device of claim 2 wherein said modulating means comprises a plurality of clocked transfer electrodes overlying said substrate between adjacent ones of said floating electrodes, said clocked transfer electrodes connected to receive a clock signal so as to transfer charge packets and store them beneath said selected ones of said floating electrodes.

4. The device of claim 1 wherein said semiconductive base comprises an epitaxial silicon layer of n-type conductivity having a sheet resistivity less than that of intrinsic silicon, said insulating layer comprises titanium dioxide, said plurality of clocked transfer electrodes and said plurality of floating electrodes comprise polycrystalline silicon, said device further comprising a plurality of p-type gate diffusions in said base beneath said floating electrodes and said clocked transfer electrodes.

5. The device of claims 1 or 4 further comprising means responsive to an external video signal for injecting charge packets beneath said transfer electrodes.

6. The device of claim 1 wherein said plurality of floating electrodes are periodically reset to a selected potential in synchronism with the clocking of said transfer electrodes.

7. The device of claim 2 wherein said modulating means comprise means for holding minority carriers in said semiconductive layer under said selected floating electrodes.

8. The device of claim 7 wherein said holding means comprise charge coupled device means for transferring charge packets in serial succession beneath said floating electrodes and storing the charge packets beneath the selected ones of said floating electrodes.

9. The device of claim 7 wherein said holding means comprise means for applying a reset clock signal voltage to said selected ones of said floating electrodes, so as to invert the surface of said semiconductive layer beneath said selected electrodes.

10. A charge transfer device liquid crystal display comprising:
    a semiconductive layer having a top surface;
    a liquid crystal layer overlying the top surface of said semiconductive layer;
    a charge transfer device including means for transferring charge in said top surface of said semiconductive layer and for defining individual buckets in said semiconductive layer wherein individual charge packets may be stored; and
    means for coupling between individual ones of said buckets and individual matrix elements comprising said liquid crystal layer, whereby charge in an individual one of said buckets modulates the capacitance between said semiconductive layer and a corresponding one of said matrix elements of said liquid crystal layer.

11. The display of claim 10 further comprising means for superimposing an electric field having a sinusoidal time domain waveform across said liquid crystal layer and said semiconductive layer, wherein the magnitude of the electric field applied across an individual one of said matrix elements is capacitively modulated by the amount of charge stored in the corresponding bucket in said charge transfer device.

12. The display of claims 10 or 11 wherein said coupling means comprises a plurality of resettable floating electrodes, each of said resettable floating electrodes comprising:

a first electrode section facing a portion of said liquid crystal layer, said portion being an individual matrix element of said liquid crystal layer; and a second electrode section connected to said first electrode section and facing a corresponding one of said buckets in said semiconductive layer.

13. The display of claim 12 wherein said first electrode section controls the electric field in the corresponding portion of said liquid crystal layer.

14. The display of claim 12 wherein said second electrode section cooperates with said charge transfer means to effect charge transfer in said top surface of said semiconductive layer.

15. The display of claim 14 wherein said charge transfer means comprise a plurality of clocked transfer electrodes individually located between adjacent ones of said second electrode sections, and wherein said clocked transfer electrodes receive a first clock signal in sychronism with a reset clock signal applied to said resettable floating electrodes.

* * * * *